(12) United States Patent
Nguyen et al.

(10) Patent No.: US 11,835,387 B2
(45) Date of Patent: Dec. 5, 2023

(54) SPECTRAL CHANNEL SPLICER FOR SPECTRAL BEAM COMBINING LASER SYSTEM

(71) Applicant: Lawrence Livermore National Security, LLC, Livermore, CA (US)

(72) Inventors: Hoang T. Nguyen, Livermore, CA (US); Michael C. Rushford, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/457,417

(22) Filed: Dec. 2, 2021

(65) Prior Publication Data

US 2023/0175888 A1 Jun. 8, 2023

(51) Int. Cl.
*G01J 3/02* (2006.01)
*G01J 3/10* (2006.01)
*G01J 3/18* (2006.01)

(52) U.S. Cl.
CPC ............ *G01J 3/0208* (2013.01); *G01J 3/021* (2013.01); *G01J 3/10* (2013.01); *G01J 3/18* (2013.01); *G01J 2003/102* (2013.01); *G01J 2003/1861* (2013.01)

(58) Field of Classification Search
CPC ............ G01J 3/0208; G01J 3/021; G01J 3/10; G01J 3/18; G01J 3/28; G01J 2003/102; G01J 2003/1861; G02B 27/10; G02B 27/14; G02B 6/00
See application file for complete search history.

(56) References Cited

U.S. PATENT DOCUMENTS

| 2007/0127123 A1* | 6/2007 | Brown ................. G02B 27/144 359/556 |
| 2007/0201795 A1* | 8/2007 | Rice ...................... H01S 3/2383 385/39 |
| 2020/0174265 A1 | 6/2020 | Nguyen et al. |

OTHER PUBLICATIONS

Paschotta, Rüdiger, "Spectral Beam Combining," RP Photonics Encyclopedia, URL: https://www.rp-photonics.com/spectral_beam_combining.html, 2021.

* cited by examiner

*Primary Examiner* — Abdullahi Nur
(74) *Attorney, Agent, or Firm* — Knobbe Martens Olson & Bear LLP

(57) ABSTRACT

A spectral beam combining system includes a spectral channel splicer comprising a plurality of reflectors and a spectral beam combiner comprising a diffraction optical element such as a diffraction grating. This spectral beam combining system may facilitate combining an increased number of spectral channels thereby producing higher optical power of the combining beam system.

20 Claims, 9 Drawing Sheets

US 11,835,387 B2

SPECTRAL CHANNEL SPLICER FOR SPECTRAL BEAM COMBINING LASER SYSTEM

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to optical beam combining, and more specifically to use of spectral channel splicers with spectral beam combining devices for combining different spectral channels corresponding to different specified frequencies in a band of frequencies as well as systems and methods related thereto.

Description of the Related Art

High peak and average powers can be produced from lasers using spectral beam combining techniques. Spectral beam combining also called wavelength beam combining or simply wavelength combining can provide power increases via beam combining. For example, a plurality of high-power laser beams can be combined to obtain a single beam with correspondingly higher power while also having a sufficiently high level of beam quality. Increased brightness may thus be obtained. Spectral beam combining may involve combining several beams having different optical spectra or wavelengths using a wavelength-sensitive beam combiner. Examples of such wavelength selective beam combiners include prisms and diffraction gratings. Such wavelength selective beam combiners may, for example, deflect incident beams of light different amounts depending on the wavelength thereby redirecting the beams so as to propagate in the same direction. The beams may also be overlapped or superimposed such that when directed along the same direction and superimposed, the separate input beams are combined into a single output beam.

SUMMARY

The present disclosure relates generally to methods and apparatus of combining the outputs of a plurality of light sources such as lasers into a single beam of sufficiently high beam quality. Various methods, devices and systems described herein enable numerous beams to be combined, facilitating the ability to provide increased intensity optical output.

For example, in one design, a spectral beam combining system comprises a plurality of input channels, a spectral channel splicer configured to receive the plurality of channels, and a spectral beam combiner configured to receive light from the spectral channel splicer. The plurality of input channels comprise a plurality of respective laser sources configured to output respective input beams along respective optical paths. Different input channels comprise different wavelengths. The spectral channel splicer comprises a plurality of reflectors. Individual reflectors are positioned to receive respective channels of the plurality of channels. The spectral beam combiner is positioned to received light from the plurality of channels reflected off the plurality of respective reflectors. The spectral beam combiner comprises a diffraction grating or other diffractive optical element such as a hologram. The spectral beam combiner is configured to direct the plurality of input beams towards the appropriate dispersion direction. The output frequency components from the different spectral bands or beams comprising the plurality of input beams exit the spectral beam combiner along adjacent parallel-paths or are overlapped, e.g., at least partially lying in or on the same path, in various implementations for included frequencies with the result of making a single focal spot where the different frequencies are overlapping spatially.

Also disclosed herein, is a spectral channel splicer comprising a plurality of reflectors and a housing supporting the plurality of reflectors in a stack such that the reflectors are stacked in a first direction. The reflectors are tilted along a second direction different than the first direction such that different reflectors are oriented in different azimuthal directions to receive respective laser beams of a plurality of laser beams from different azimuthal angles and direct said laser beams along an appropriate direction toward the spectral beam combiner. In some implementations, the reflectors may direct the different beams along a common azimuthal angle or possibly in slightly different directions, e.g., possibly within a suitable dispersion surface contour, "smile" or "frown", on the curved or planar surface of the dispersive device.

The present disclosure may be used in industrial beam combining and any other application where different wavelength beams can be combined possibly to provide system performance advantages.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

FIG. 3 depicts a plurality of reflectors (e.g., 5 reflectors) in the spectral channel splicer receiving and redirecting respective input channels.

Figure 3:
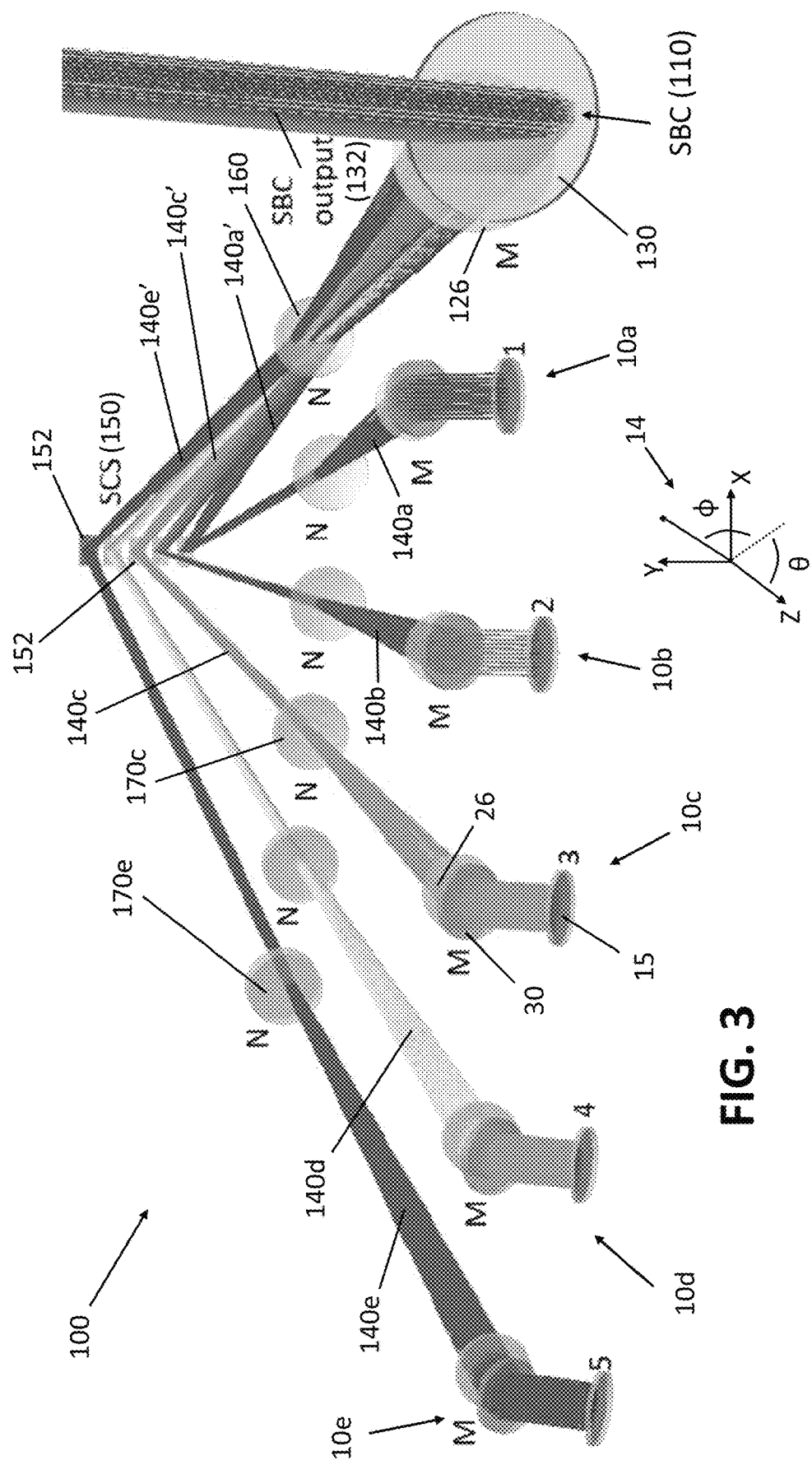
FIG. 3 is perspective view of an example spectral beam combining system comprises a plurality of input channels (e.g., 5 channels) combined together using a spectral channel splicer and a spectral beam combiner.
Figure 4:
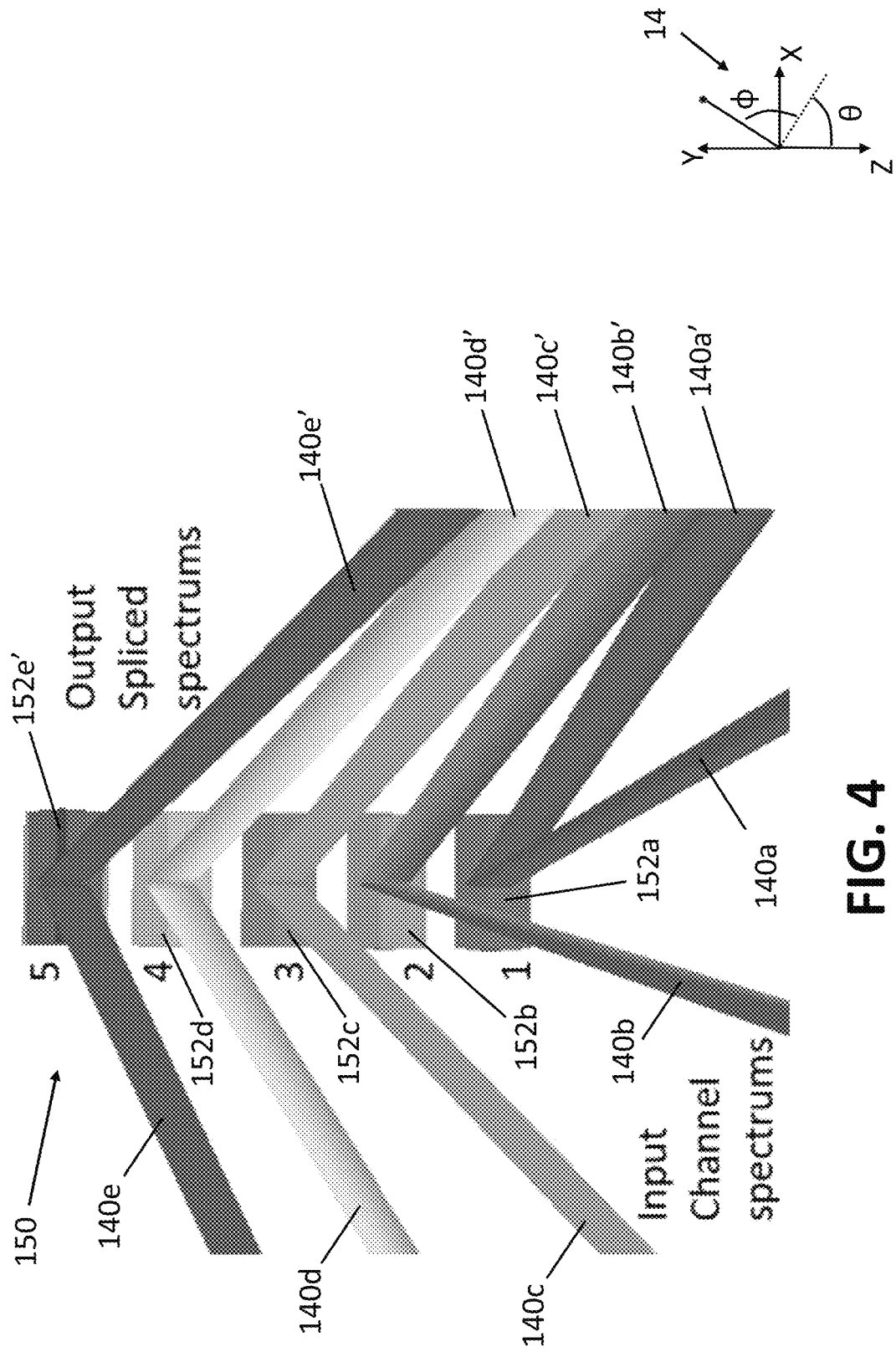
FIG. 4 is a close-up front view of the plurality of reflectors (e.g., 5 reflectors) shown in the spectral channel splicer in FIG. 3 as receiving and redirecting respective input channels.
Figure 5:
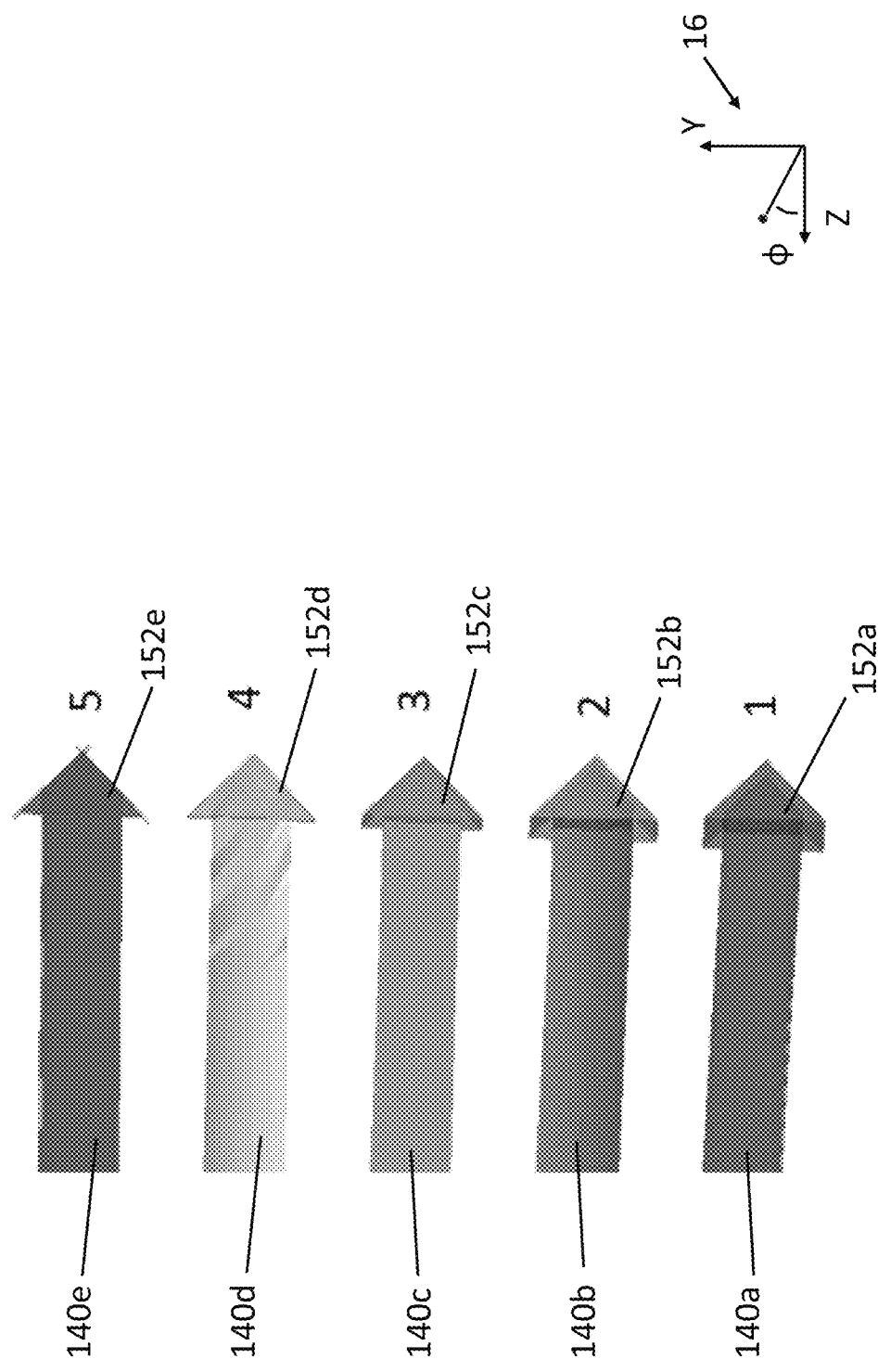
FIG. 5 is a side view the plurality of reflectors (e.g., 5 reflectors) in the spectral channel splicer shown in FIGS. 3 and 4. The reflectors in this example are right angle prisms, although the prisms could be substituted with one or more mirrors.
Figure 6:
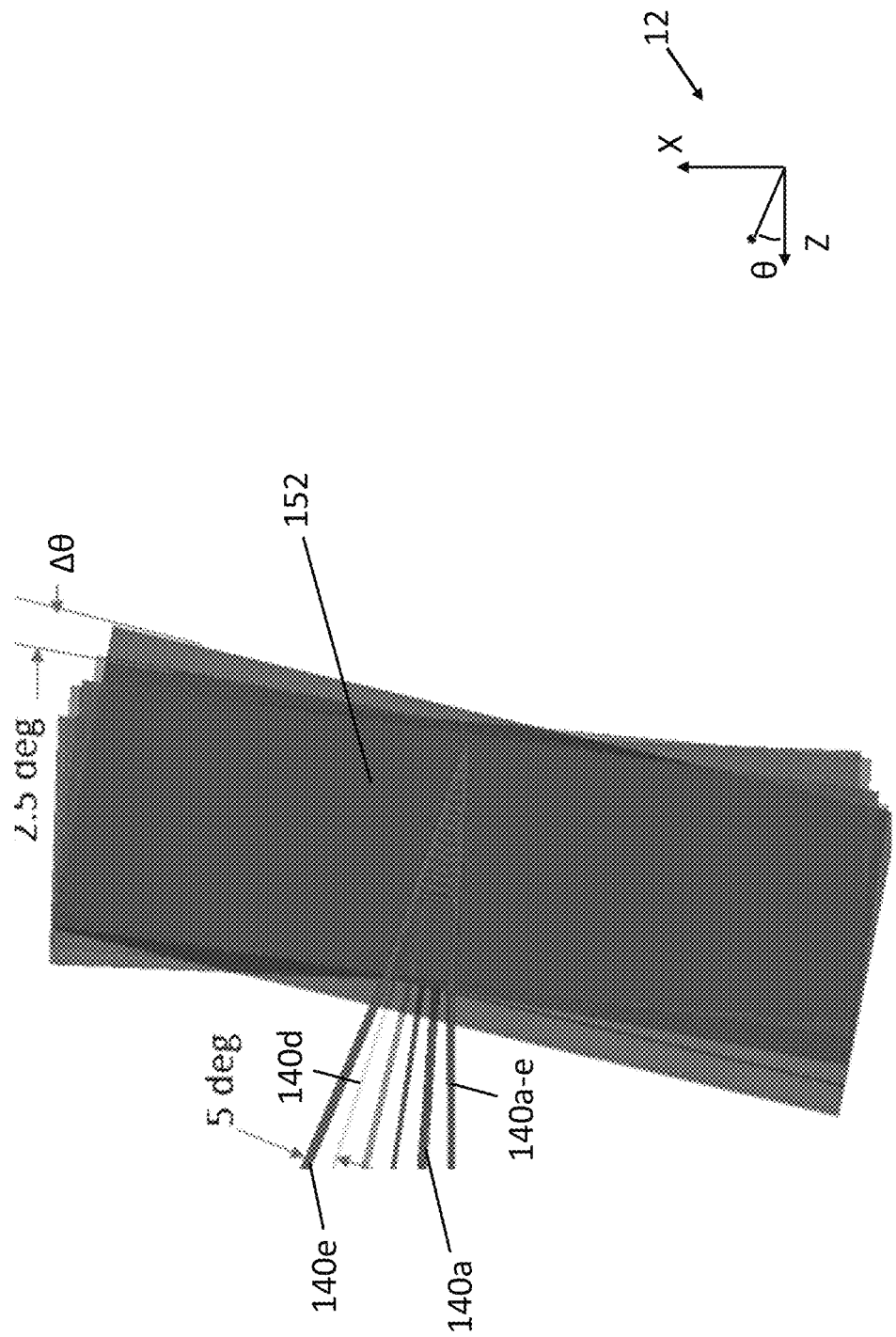

FIG. 6 is a top view the plurality of reflectors (e.g., 5 reflectors) shown in the spectral channel splicer in FIGS. 3-5. The reflectors are illustrated reflecting/deflecting light azimuthally in FIG. 6.

Figure 7:
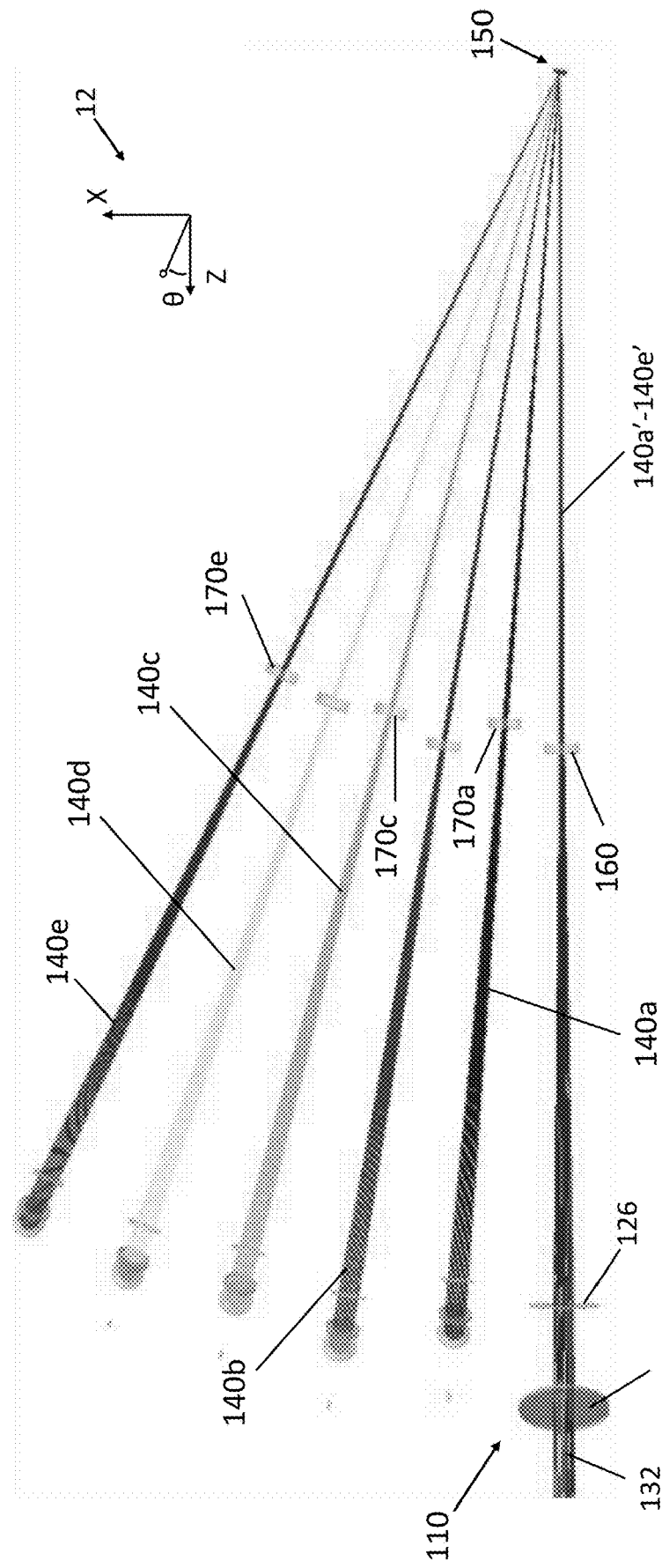

FIG. 7 is a top view of the spectral beam combining system illustrating the plurality of channels (e.g., 5 channels) being reflected/deflected by the reflectors of the spectral channel splicer into the same azimuthal angle.

Figure 8:
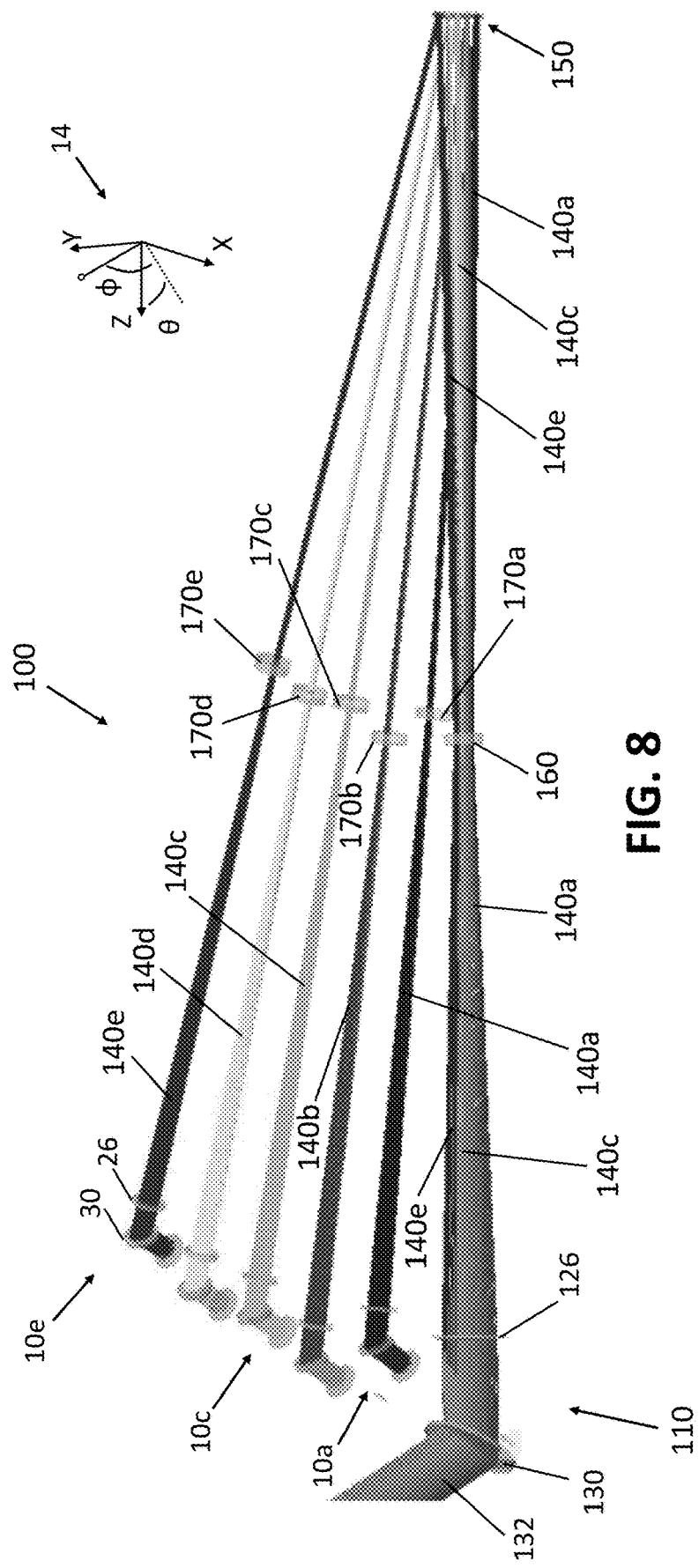

FIG. 8 is perspective side view of the spectral beam combining system illustrating the plurality of channels (e.g., 5 channels), which are reflected/deflected by the reflectors of the spectral channel splicer into the same azimuthal angle (e.g., in a horizontal plane), also being reflected in an orthogonal direction (e.g., in a vertical plane) by the reflectors to provide the desired elevation angle.

Figure 9:
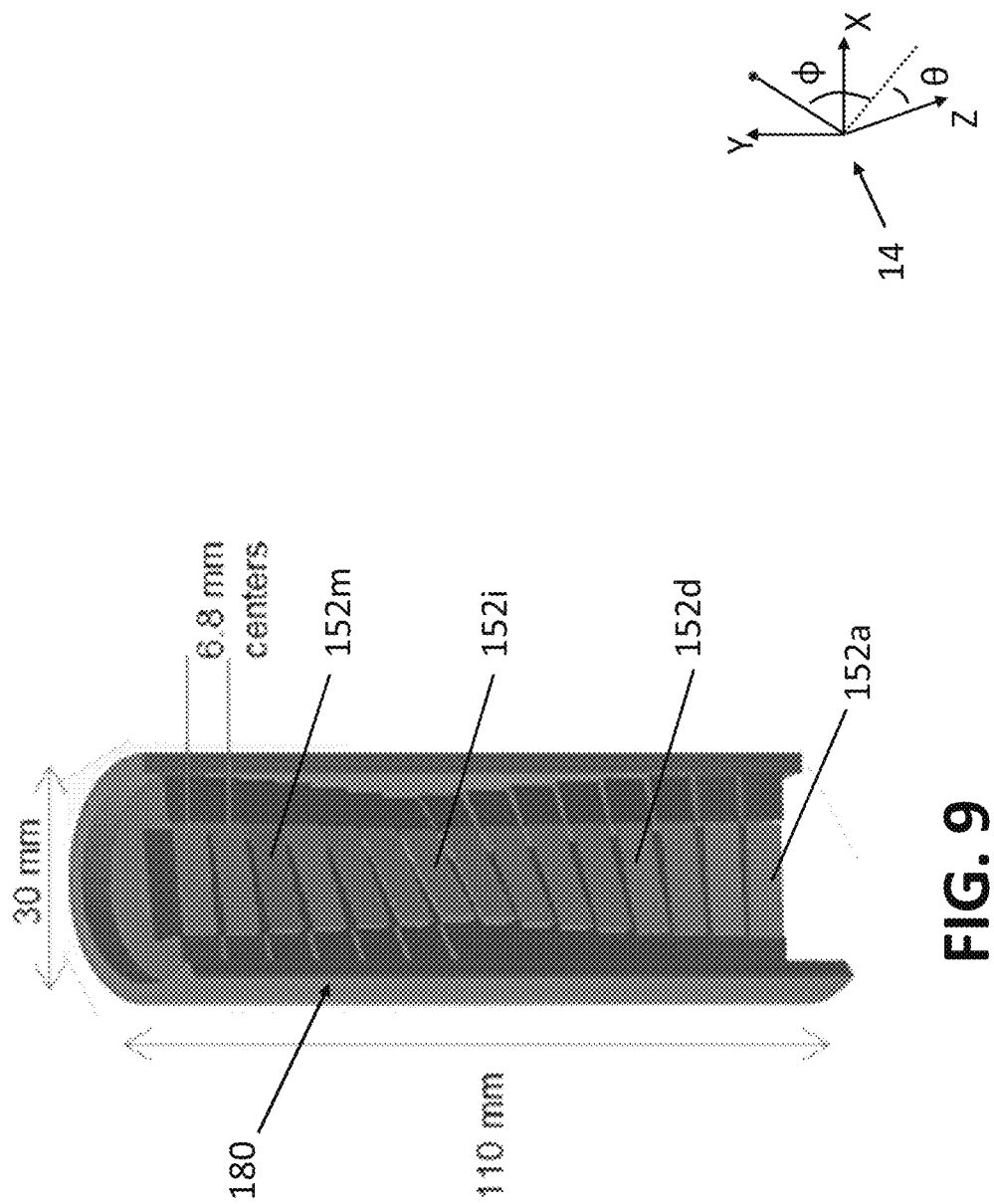

FIG. 9 is perspective view of the spectral channel splicer showing the plurality of reflectors (e.g., 15 reflectors) stacked in a housing. As illustrated, various reflectors are tilted azimuthally with respect to each other.

DETAILED DESCRIPTION

As discussed above, a high intensity laser beam can be produced by combining laser beams from a plurality of lasers. Various designs described herein can facilitate significant scaling of the number of lasers that can be integrated together to increase the power and intensity of the resultant laser beam. Spectral beam combining, wherein laser beams having different wavelengths, wavelength distributions or wavelength spectra are combined together can be employed. Diffractive optical elements such as diffraction gratings or holograms, which have angular dispersion wherein the angle of incidence and/or the angle of diffraction are affected by the wavelength of light, can be used to redirect light having different wavelengths that are incident at different angles into the same angle. These beams can also be at least partially overlapped or superimposed such that a single higher powered aggregate light beam is produced.

Figure 1:
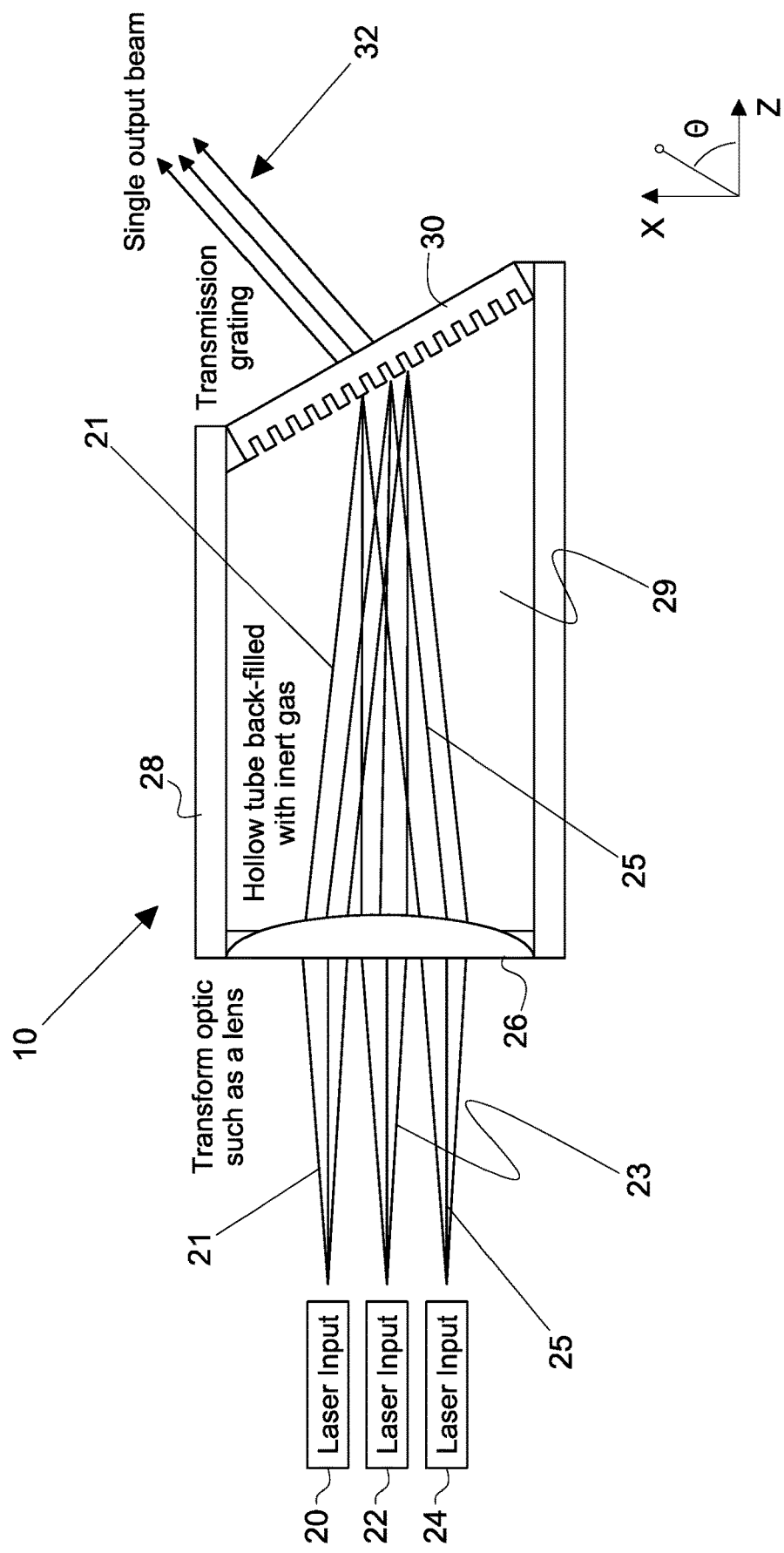
FIG. 1 is a schematic view of an example of a transmissive spectral beam combiner showing three beams from three lasers having different spectral distributions (e.g., three different spectral bands) with different center wavelengths and bandwidths (possibly narrow bandwidths) being combined together.

Turning to the drawings, FIG. 1 shows an example spectral beam combiner 10 comprising transform optics (e.g., a lens) 26 and a diffraction diffractive optical element (e.g., a diffraction grating) 30. In this example, the spectral beam combiner 10 is a transmissive spectral beam combiner operating in transmission. In this design, the transform optics 26 is a transmissive optical element, a lens, redirecting light beams passing therethrough via refraction, and the diffractive optical element 30 comprises a transmissive diffractive optical element, namely, a transmission diffraction grating, that diffracts beams that are transmitted therethrough. In the example shown in FIG. 1, the transform optics or lens 26 and the transmission diffractive optical element or grating 30 are integrated in a housing 28. This housing 28 may comprise a hollow tube with the transform optics 26 and diffractive optical element or grating 30 at opposite ends thereof. In the example shown, diffractive features are included on the inside facing side of the diffractive optical element/diffraction grating 30. The housing 28 together with the transform optics 26 and diffractive optical element 30 may form an air-tight region that may be filled with inert gas in the region 29 between the transform optics 26 and grating 30. Such a design may increase the laser power threshold for the spectral beam combiner 10. Additional details regarding spectral beam combiners 10 are discussed in U.S. Patent Publication No. 2020/0174265 A1 titled "Monolithic Transmitting Spectral Beam Combiner" listing Hoang T. Nguyen, and Michael C. Rushford, as inventors. Other spectral beam combiner designs, however, can be employed in the systems and subsystems described herein. For example, the transform optics 26 and diffractive optical element 30 need not be combined together with an airtight housing 28 such as shown in FIG. 1 and/or the diffraction optical element may comprise a hologram.

FIG. 1 also shows a plurality of lasers 20, 22, 24, three in this example, configured to output respective laser beams 21, 23, 25. The lasers 20, 22, 24 are arranged in an array in this example, e.g., a linear array, although the lasers could be in other arrangements such as a two-dimensional array. The lasers 20, 22, 24 are positioned on one side of the transform optics 26 such that the laser beams 21, 23, 25 are incident on the transform optics. The transform optics 26 is configured to redirect the different laser beams 21, 23, 25 in different directions such that the laser beams are incident on the diffractive optical element/diffraction grating 30 at different angles. As the lasers 20, 22, 24 are located at different (e.g., lateral, vertical, horizontal, etc.) positions with respect to the transform optics 26, the light beams are incident on the transform optics at different locations, which results in the light beams being redirected in different directions. For example, the transform optics, in this case is lens 26. The lens 26 is configured such that light beams 21, 23, 25 incident on different portions of the lens will be redirected at different angles. Specifically, in this example, the curvature of the lens surface(s) as well as the refractive effect of the transmissive material of the lens 26 cause the laser beams 21, 23, 25 to be refracted and redirected in different directions depending on where the laser beam is incident on the lens. As a result, the laser beams 21, 23, 25 upon transmission through the lens 26, will be directed at different directions.

In various implementations, the lasers 20, 22, 24 comprises different wavelength lasers that output laser beams 21, 23, 25 having different wavelengths or wavelength spectrums.

As discussed above, the transform optics 26 can be designed such that the different beams 21, 23, 25 having different wavelengths or spectra are incident on the diffractive optical element or diffraction grating 30 at different angles. As discussed above, however, the diffraction grating 30 cause the different wavelengths to be diffracted different amounts. In various designs described herein, the spectral beam combiner 10 is configured such that the laser beams 21, 23, 25 are incident on the diffractive optical element or grating 30 at appropriate angles and have appropriate wavelengths such that the beams are diffracted different amounts so as to be diffracted into the same angle. The laser beams 21, 23, 25 are also redirected by the transform optics 26, for example, focused by the lens, such that the beams overlap or are superimposed when incident on the diffractive optical element 30. These beams 21, 23, 25 remain overlapping or superimposed after diffraction by the diffraction grating 30 along the same direction. The multiple beams 21, 23, 25 overlapping and directed at the same angle thus form a single higher intensity beam 32 including combined optical power from the separate laser beams.

The design of the transmission diffractive optical element or grating 30 can depend at least in part on parameters of the transmission diffractive optical element or grating. These parameters may include, but are not limited to, line density, diffractive feature height or grating profile height, diffractive feature width or grating profile width, effective optical index or any combination of these. Other features of the diffractive optical element or grating 30 may also be adjusted accordingly. As shown in FIG. 1, the first input beam 21 can be incident on the transmission grating 30 at a first angle, the second input beam 23 can be incident on the transmission grating at a second angle, and the third input beam 25 can be incident on the transmission grating at a third angle, (e.g., measured with respect to the normal to the transmission grating). As discussed above, these angles (determined in part by the location of the laser beams 21, 23, 25 incident on the transform optics/lens 26) and the wavelengths of the corresponding laser beams may be such that the laser beams are diffracted different amounts by the diffraction grating 30 and the different beams are thereby directed along the same angle after exiting the diffraction grating.

As referenced above, these beams may also be superimposed or overlapped. For example, in some designs, at least 10%, 20%, 30%, 40%, 50%, 60%, 70%, 80%, 85%, 90%, 95%, 97%, 98%, 99%, 99.5%, 99.8%, 99.9%, 99.99%, 99.999%, or 100% of the beams light may be superimposed or overlapped. In some implementations, the overlap may be in any range formed by any of these percentages such as from 90% to 100% or less than 100% but at least 85% or other ranges as well. As discussed above, the beams may also be directed in the same angle. Accordingly, in some cases, the beams 21, 23, 25 at the output of the diffractive optical element or grating 30 may be collinear (e.g., substantially collinear). In some instances, system design tolerance may allow some offsets such as positioning offsets or misalignments, e.g., depending on the overall system design.

The transform optics 26 and/or diffractive optical element 30 can be fabricated in any material known in the art or yet to be developed, e.g., in fused silica, silicon, diamond, silicon nitride, etc. In various designs, these optical components can be fabricated to allow high power handling. For example, the transform optics 26 and/or diffraction optical element 30 can comprise a material having a high laser induced damage threshold, e.g., at least 5.0 eV (e.g., 5.0 eV, 6.0 eV, 7.0 eV, 8.0 eV, 9.0 eV, 10.0 eV, etc. or any ranges formed by any of these values), including but not limited to fused silica, diamond, silicon nitride, aluminum oxide, aluminum nitride, boron nitride, etc. The diffractive optical element 30 need not be limited to any particular type. For example, the diffractive optical element 30 need not be planar nor need not be a diffraction grating. Systems, devices and methods described herein are applicable to any implementation, wavelength, type of diffractive optical element, e.g., reflective, transmissive, plane or 2D and 3D dispersive periodic shape, etc. Other types of diffractive optics such as a wide range of holograms may be employed.

Patterning such as etching may be employed to form the grating or diffractive optical element 30. As discussed above, various parameters of the grating or diffractive optical element 30 such as grating spacing, height and/or width and/or period of diffractive features (e.g., groove depth, feature height, groove width, feature width, groove period, feature period, groove spacing, feature spacing), material and material refractive index, effective refractive index and/or other parameters and any combination thereof may be configured to provide the desired features so as to cause the beams of different spectrums incident thereon to be diffracted into the same angle.

Other variations, however, are possible. For example, in some designs, instead of the diffractive features being on the forward surface or side of the diffraction grating 30 as shown in FIG. 1, the diffractive features may be on the rearward surface or side or on both sides.

Figure 2:
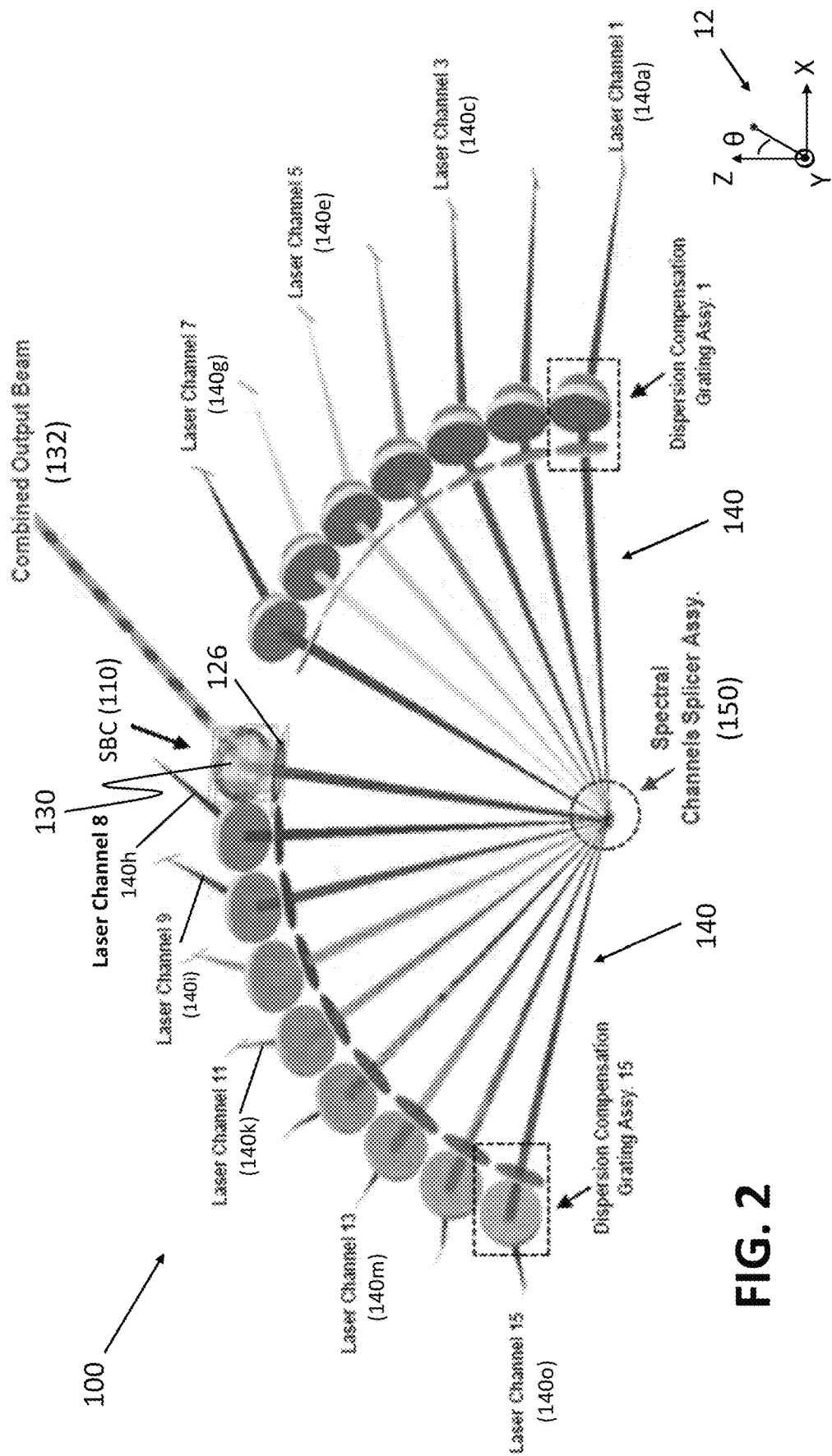
FIG. 2 is a top view of an example spectral beam combining system comprises a plurality of input channels (e.g., 15 channels) different spectral distributions (e.g., 15 different spectral bands) with different center wavelengths and bandwidths (possibly narrow bandwidths) combined together using a spectral channel splicer and a spectral beam combiner.

As discussed above, in various designs described herein, the input beams 21, 23, 25 having different spectra may be incident on the spectral beam combiner 10, the transform optics 26, and diffractive optical element or grating 30 where these light beams are combined and exit as combined beam 32. While three input lasers 20, 22, 24 and corresponding laser beams 21, 23, 25 are shown, the number can be made smaller or larger. FIG. 2, for example, shows a spectral beam combining system 100 where a larger number of channels 140, e.g., 15 channels 140a-140o, are combined together using a spectral channel splicer 150 and a spectral beam combiner (SBC) 110. In particular, the plurality of channels 140 are directed to the spectral channel splicer 150 and redirected by the spectral channel splicer to the spectral beam combiner 110. In this manner, a large number of channels (e.g., here 15 channels) can be combined by the spectral beam combiner 110 to produce a higher power combined output beam 132. FIG. 2 is a top view of the spectral beam combining system 100.

In various implementations described herein, the channels 140 may comprise different wavelength or spectral channels having different wavelength spectra, wavelengths or wavelength distributions. In various implementations, for example, each of the channels comprise different wavelengths. For example, the design illustrated in FIG. 2 shows fifteen channels 140a-140o, each having different spectral distributions or spectrums and more specifically, each having different wavelengths or colors. The combined output beam 132 can thereby have a combined spectral distribution that includes the different wavelengths included in the plurality of different spectral channels 140.

As illustrated in FIG. 2, the plurality of channels 140 can be arranged about the spectral channel splicer 150 in a manner so as to densely pack numerous channels around the spectral channel splicer 150. In the configuration shown in FIG. 2, for example, the channels 140a-140o are arranged at different azimuthal locations about the spectral channel splicer 150. The spectral channel splicer 140 is configured to receive light from the plurality of channels 140a-140o disposed about the spectral channel splicer 150 and redirect the light from the various channels toward the spectral beam combiner 110, e.g., into the same azimuthal angle toward the spectral beam combiner 110 or close thereto depending on the design.

As discussed above, the transform optics 126 are configured to redirect the light from the different channels 140a-140o in different directions such that these laser beams are incident on the diffractive optical element/diffraction grating 130 at different angles. As the laser beams corresponding to the different channels 140a-140o are located at different positions with respect to the transform optics 126 (e.g., different vertical positions and/or different position along the direction parallel to the y-axis in the xyz coordinate system 12), the light beams are incident on the transform optics at different locations, which results in the light beams being redirected in different directions. For example, the transform optics 126, in this case is a lens. The lens 126 is configured such that separate channels 140a-140o incident on different portions of the lens will be redirected by refraction at different angles onto the diffraction grating. In addition, the diffraction grating 130 causes different wavelengths to be diffracted different amounts. In various designs described herein, the spectral beam combiner 10 is configured such that the different spectral channels 140a-140o are incident on the diffractive optical element or grating 130 at appropriate angles and have appropriate wavelengths such that the different beams are diffracted different amounts so as to be diffracted into the same angle. The light from the laser beams corresponding to the different channels 140a-140o are also redirected by the transform optics 126, for example, collimated by the lens, such that the beams at least partially overlap or are at least partially superimposed when incident on the diffractive optical element 130. These beams 140a-140o remain at least partially overlapping or superimposed after diffraction by the diffraction grating 130 along the same direction. The multiple beams 140a-140o, collinear, overlapping and directed at the same angle, thus form a single higher intensity beam 132 including combined optical power from the separate laser beams.

The plurality of channels 140a-140o are directed by the spectral channel splicer 150 to the spectral beam combiner 110 where light from the different channels are combined together into the output beam 132. A spectral beam combiner 110 such as described above, for example in connection with FIG. 1, which comprises transform optics, e.g., a lens, 126 as well as a diffractive optical element, e.g., a grating or hologram, 130 may superimpose and redirect the light beams corresponding to the different channels 140a-140o in the same direction so as to produce a single beam 132.

Although 15 channels 140a-140o are shown in FIG. 2, the number of channels can be more or less. Additionally, the plurality of channels 140a-140o are on opposite sides of the spectral beam combiner 110 and the spectral channel splicer 150. In particular, FIG. 2 shows 7 channels 140a-140g on a first side of the spectral beam combiner 110 and the spectral channel splicer 150 and 8 channels 140h-140o on a second side of the spectral beam combiner 110 and the spectral channel splicer 150 opposite of the first side. The number of channels 140 on either side of the spectral beam combiner 110 and the spectral channel splicer 150 can be more or less, can be equal or unequal. Accordingly, the arrangement can be symmetric or unsymmetric.

FIG. 2, which is a top view, illustrates how the spectral channel splicer 150 receives the plurality of laser beams corresponding to the plurality of different spectral channels 140a-140o and directs the plurality of input beams toward the same direction. The direction of the different channels can be characterized in part by an azimuthal angle, θ, in the x-z plane shown by the xyz coordinate system 12 depicted in FIG. 2 or a plane parallel thereto. This azimuthal angle, θ, may correspond to the angle with respect to the x or z axis of the projection of the of the spectral channel 140 onto the x-z plane. (In FIG. 2, the azimuthal angle is with respect to the z axis of the xyz coordinate system 11.) The spectral channel splicer 150 is configured to receive the plurality of different spectral channels 140a-140o, which are directed along different azimuthal angles, θ, and redirect these laser beams along a common azimuthal angle, θ, or the same direction projected onto the x-z plane in some implementations or close thereto. The spectral channel splicer 150 is therefore configured to change the azimuthal angle, θ, of the different channels 140a-140o such that the channels are directed along the same azimuthal angle, θ or close thereto. In some designs, the channels may be directed mostly along the same direction with some deviations, e.g., within the dispersion surface contour and/or curved or plane of the dispersive device. In some designs or configurations, the channels may be directed mostly along the same direction with some deviations to produce what is referred to as a "smile" or "frown".

FIG. 3 is a perspective view a spectral beam combining system 100 combining spectral channels, e.g., 5 channels, 140a-140e using a spectral channel splicer 150 and a spectral beam combiner 110. As in FIG. 2, the spectral channel splicer 150 receives the plurality of laser beams corresponding to the different channels 140a-140e at different azimuthal angles, θ, and redirects these laser beams along a common direction or azimuthal angle, θ, in or parallel to the x-z plane as shown in the xyz coordinate system 14 or close thereto, e.g., to accommodate dispersion surface contour and/or curved or plane of the dispersive device. As discussed above, this azimuthal angle, θ, may correspond to the angle with respect to the x or z axis of the projection of the of the spectral channel 140 onto the x-z plane. (In FIG. 3, the azimuthal angle is with respect to the z axis of the xyz coordinate system 14.) The spectral channel splicer 150 is configured to receive the plurality of different spectral channels 140a-140o, which are directed along different azimuthal angles, θ, and redirect these laser beams along a common azimuthal angle, θ, or the same direction projected onto the x-z plane or a plane parallel thereto or close thereto with some deviation, e.g., to produce what may be referred to as a "smile" or "frown." The spectral channel splicer 150 is therefore configured to change the azimuthal angle, θ, of the different channels 140a-140o such that the channels are directed along the same azimuthal angle, θ in some designs or approximately along the same azimuthal angles, θ, with some variation between channels in some design. The different channels 140a-140e are received by a spectral beam combiner 110 that outputs a combined laser beam 132 having higher power than any of the individual channels 140a-140e alone.

The optical channel splicer 150 shown in FIG. 3 comprises a plurality of channel optical elements (COE) comprising reflectors 152. These channel optical elements or reflectors 152 are stacked linearly along the vertical direction, e.g., parallel to the y axis in the xyz coordinate system 14 shown in FIG. 3. A close-up of the optical channel splicer 150 from the front is shown in FIG. 4. The reflectors 152 are shown spaced apart from adjacent reflectors in the vertical direction. The plurality of reflectors 152a-152e are shown receiving and redirecting respective ones of the plurality of channels 140a-140e. The laser beams corresponding to the plurality of channels 140a-140e incident on the reflectors 152a-152e are on the left side of the reflectors as shown in FIGS. 3 and 4. In contrast, the redirected/reflected beams are the plurality of channels 140a'-140e' on the right side of the reflectors 152a-152e as shown in FIGS. 3 and 4. These redirected beams 140a'-140e' are directed in the same or approximately the same azimuthal direction or azimuthal angle, θ, with some variation by the reflectors, which may be oriented or otherwise configured differently to provide the appropriate amount of beam deflection to accomplish this goal. In FIGS. 3 and 4 the channel paths (on the left of the reflectors 140a-140e in the figures shown) are spliced into linear stacking into the output paths (on the right of the reflectors in the figures shown). Additionally, respective ones of the plurality of channels 140a-140e are incident on the respective reflectors 152a-152e at different azimuthal directions or angles, θ, which also contributes to the different directions/angles at which the channels 140a'-140e' are redirected upon reflection from the reflectors. In the example shown, the spectrum of the plurality of channels 140a-140e, from bottom to top, corresponds to a progression from shorter wavelength to longer wavelength. However, in other designs, the channels with longer wavelengths may be closer to the bottom while the channels with shorter wavelengths may be closer to the top.

The plurality of reflectors 152a-152e may comprise a variety of types of reflectors. One of the reflectors 152 may have one or more reflective surfaces that reflect the laser beam corresponding to the spectral channel 140 that is incident thereon. In various implementations, the reflectors 152 comprise prisms and may comprise prisms that employ total internal reflection to reflect light. The prisms may include one or more reflecting surfaces that reflect and redirect the beam incident thereon.

While FIG. 4 shows a front view of the plurality of reflectors 152a-152e of the spectral channel splicer 150, FIG. 5 shows a side view. FIG. 5 shows the reflectors 152 as comprising prisms such as TIR reflecting prisms, e.g., comprising a front input surface and two smaller rear reflecting surfaces. These prisms may, for example, comprise right angle prisms, with the two smaller rear reflecting surfaces being oriented at a right angle with respect to each other. In the example shown, the beam 140 incident on the reflector 152 reflects from the two reflecting surfaces on the back of the prism possibly via total internal. Other types of reflectors may be used, such as roof mirrors or a reflector providing single surface reflection. One or more optical coatings may also be provided in some designs. For example, the input surface to the prism may have an antireflective (AR) coating thereon, which may potentially comprise a nano AR coating (e.g., surfaces sometimes referred to as metasurfaces having sub-wavelength texturing such as nanometer scale features or texturing). Some such coatings may provide reduced reflection from the interface over a broad wavelength range. In the reflection, e.g., prism, design shown FIG. 5, the shorter length surfaces of the prism causing the beam to be reflected may be uncoated, in particular, for TIR or in various other implementations. The prism may comprise low absorption silicon dioxide ($SiO_2$), possibly fused silica, in some designs. The nano AR coating may comprise the native material of the prism, e.g., ($SiO_2$), possibly fused silica. Not having a mirror coating may reduce absorption and surface heating as well as possibly cost. However, use of reflecting coatings and/or mirrors in some designs may be possible. Prisms such as TIR reflecting prisms can offer reduced mounting angular sensitivity compared to mirrors that may magnify angular mounting errors by two times, although mirrors may also be potentially employed.

FIG. 5 shows a side view of the laser beams corresponding to the different spectral channels 140a-140e and the corresponding elevation angle, $\varphi$, at which the beams are incident on and reflected from the respective reflector 152a-152e. This elevation angle, $\varphi$, may correspond to the angle with respect to the y or z axis of the projection of the of the spectral channel 140 onto the y-z plane such as in the coordinate system 16 depicted in FIG. 5. (In FIG. 5, the elevation angle, $\varphi$, is with respect to the z axis of the yz coordinate system 14.) The spectral channel splicer 150 is configured to receive the plurality of different spectral channels 140a-140o, which are directed along different elevation angles, $\varphi$, and redirect these laser beams along an elevation angle, $\varphi$, or direction projected onto the y-z plane or a plane parallel thereto that is appropriate for that particular channel so as to be incident on the spectral beam combiner 110 at the appropriate angle and position. In various implementations, the spectral channel splicer 150 is configured to maintain the elevation angle, $\varphi$, of the different channels 140a-140o such that the channels are directed along the same elevation angle, $\varphi$, at which they are incident on the respective reflectors 152a-152e. In the configuration shown in FIG. 5, the different channels 140a-140e are incident on the respective reflectors 152a-152e at different elevation angles, $\varphi$, and also reflected from the reflectors at different elevation angles, $\varphi$, with respect to each other. As visible from FIG. 5, for example, the first channel 140a is incident on the first reflector 152a at a higher elevation angle, $\varphi$, than the fifth channel 140e is incident on the fifth reflector 152e. Similarly, the first beam 140a reflected from the first reflector 152a is directed at a higher elevation angle, $\varphi$, than the fifth beam 140e is reflected from the fifth reflector 152e. Other configurations are possible. However, in various designs, the optical beam combining system 100 and the spectral channel splicer 150 are configured so as to direct the different channels 140 onto the spectral beam combiner 110 at the appropriate elevation angles, $\varphi$, so that the spectral beam combiner will redirect the channels into the same elevation angle, $\varphi$, to produce a common output beam. For example, as shown in FIG. 5, the different channels 140a-140e are received by a spectral beam combiner 110 at the suitable position (e.g., height parallel to the y axis) such that the spectral beam combiner outputs the different spectral channels along the same elevation angle, $\varphi$, thereby facilitating the combining of the laser beams into a single combined laser beam 132 having higher power than any of the individual channels alone.

Referring again to FIG. 3, the different channels 140a-140e are incident on the reflectors 152a-152e at different angles and similarly reflected therefrom so as to be directed at different angles. These reflected beams 140a-140e, although having a common azimuthal angle, $\theta$, in FIG. 3 so as to be aligned in the azimuthal direction after being reflected from the reflectors 152a-152e of the spectral channel splicer 150 have different elevations angles, $\varphi$ so as to be incident on the spectral beam combiner 110 at the proper position and location so as to be deflected along the same direction to form a common beam 132. As shown, the spectral beam combiner 110 comprises the transform optics 126 (e.g., transform lens) and the diffractive optical element (e.g., diffraction grating) 130. The spectral beam combiner 110 can be similar to that shown in FIG. 1 and have similar features as discussed above with reference to FIG. 1. Likewise, the beams 140a'-140e' reflected from the reflectors 152a-152e, although having a common azimuthal angle, $\theta$, in the design shown in FIG. 5, so as to be aligned in the azimuthal direction after being reflected from the reflectors of the spectral channel splicer 150 have different elevations angles, $\varphi$ so as to be incident on the transform optics 126 (e.g., transform lens) at the proper position and location so as to be deflected by the diffractive optical element (e.g., diffraction grating) 130 along the same direction (e.g., same elevation angle, $\varphi$, as well as same azimuthal angle, $\theta$) and are overlapping or superimposed to form a common output beam 132. As stated above, in the design shown in FIGS. 3 and 5, the reflectors 152 comprise reflectors that may be configured to reflect the beams at the same elevation angle, $\varphi$, as the beams are incident thereon. The incident elevation angles, $\varphi$, of the beams are therefore such that the reflected beams have the appropriate elevation angles, $\varphi$, and positions when incident on the transform optics (e.g., lens) and diffractive optical element (grating) of the spectral beam combiner 110.

As shown in FIG. 3, in some designs, the optical beam combining system 100 further comprise a lens such as a negative lens 160 in the path of the beams 140a'-140e' reflected from the reflectors 152 of the spectral channel splicer 150. This negative lens 160 shortens the optical path from the reflectors 152 to the spectral beam combiner 110. Accordingly, the overall system may be smaller as a result of the negative lens 160.

This negative lens 160 may cause the light in the individual beams 140a'-140e' to converge at a less fast rate.

Similarly, this negative lens 160 may cause the beams 140a'-140e' to spread across the transform optics (e.g., transform lens) 126 and maintain the proper direction as well as possibly suitable dimensions of the beams 140a'-140e' at the appropriate angles on the diffractive optical element (e.g., diffraction grating) 130.

Similarly, negative lenses 170a-170e are included in the plurality of channels 140a-140e incident on the spectral channel splicer 150 in various implementations. These negative lenses 170a-170e may comprise the same type of lens in certain designs. For example, the negative lenses 170a-170e in one or more or each of the spectral channels may have the same focal length. In some implementations, these negative lenses 170a-170e may cause the beams 140a-140e to converge at a slower rate. The negative lenses 170a-170e shorten the optical path of the optical system possibly providing a more compact system. The negative lenses 170a-170e are also such that the size of the beam (e.g., radius, height, width, and/or area of the cross-section of the beam) to be suitable for the size (e.g., height width, radius, and/or area of the cross-section or clear aperture) of the reflector 152a-152e on which the channel beam is incident. For example, the negative lenses 170a-170e may be configured so as to provide sufficiently wide beam on the spectral splicer mirrors or prisms 152a-152e. such that the irradiance incident on the reflectors does not cause overheating and/or optically damage the optical surfaces of the reflectors.

The optical beam combining system 100 such as shown in FIG. 3 combines a plurality of spectral beam channels 140a-140e using the spectral channel splicer 150 and the spectral beam combiner 110 to produce a more powerful combined beam 132. Additionally, in various designs, the optics included in the optical paths of the input spectral channels 140a-140e are configured to spread the wavelengths of light of the individual channel across the respective reflector 152a-152e. For example, light from light source or laser 15 associated with a particular channel can be dispersed using a diffractive optical element (e.g., a grating) 30 such as shown in FIG. 3 to disperse the light in the spectral channels 140a-140e. The different wavelengths in an individual channel 140 may be dispersed in the direction in which the reflectors 152a-152e are stacked, for example in the vertical direction (e.g., parallel to the y direction as shown in FIG. 3) in some implementations. This diffractive optical element or grating 30 shown in FIG. 3 is a transmission diffractive optical element or grating that operates in transmission diffracting light transmitted therethrough. As discussed above, the laser or light source 15 may output a beam having a center wavelength and a bandwidth and thus comprises a plurality of wavelengths. The diffractive optical element or grating 30 may disperse these wavelengths, diffracting different wavelengths at different angles such that the different wavelengths are directed in slightly different directions. Accordingly, the different wavelengths output by the light source or laser 15 are incident on different portions the reflector 152. The spectrum of wavelengths output by the light source 15 is thereby spatially dispersed across the reflector 152, (e.g., across the height of the reflector, different wavelengths being directed to and therefore incident on different locations in the y direction in FIG. 3). In various designs, if the channel 140e directed to the highest reflector 152e in the stack has a longer wavelength than the channel 140a directed to the lowest reflector 152a in the stack, then the dispersion by the input grating 30 may be such that longer wavelengths from the light source 15 in an individual channel are directed to a higher location on the reflector while short wavelengths are directed to a lower location on the reflector. Similarly, in various designs, if the channel 140e directed to the highest reflector 152e in the stack has a shorter wavelength than the channel 140a directed to the lowest reflector 152a in the stack, then the dispersion by the input grating 30 may be such that shorter wavelengths from the light source 15 in an individual channel are directed to a higher location on the reflector while longer wavelengths are directed to a lower location on the reflector. In some implementations, the light incident on the reflector 152 forms a complex spectrum relative to the situation where the laser light sources have a square spectrum.

A lens 26 is disposed in the optical path of the channel to receive the light diffracted by the diffractive optical element/grating 26. This lens 26 may comprise, for example, a positive lens that causes the beam (which is shown in FIG. 3 as a collimated beam) to converge (in both the horizontal and vertical directions) toward the respective reflector 152 in the spectral channel splicer. The negative lens 170 may reduce the rate of convergence. Accordingly, the positive lens 26 and companion negative lens 170a-170e (also labeled N) along with the diffractive optical element 30 cooperate to project an angularly disperse spectrum across the channel splicer reflector 152 in FIG. 3. Moreover, in various implementations, the positive and negative lenses 26, 170a-170e together with the diffractive optical element 30 are configured to provide sufficient spectral channel dispersion in the beam at the spectral splicer mirrors or prisms 152a-152e. Additionally, this spectrally dispersed beam height on the different reflectors 152a-152e may also be such that the irradiance incident on the reflectors does not cause overheating and/or optically damage the optical surfaces of the reflectors. Accordingly, in various designs, system 100 is configured such that the beam 140 is spread across the reflector 152 to distribute energy across a larger surface area and reduce laser induced damage.

In various implementations, the combination of the diffractive optical element 30 and the lens 26 comprises an optical beam combiner 10 such as shown in FIG. 1 in reverse order. For example, instead of comprising transform optics 26 comprising a lens followed in the optical path by a diffractive optical element or diffraction grating 30 as shown in FIG. 1, the diffractive optical element or grating is followed in the optical path by the lens in the system 100 shown in FIG. 3. Likewise, the diffractive optical elements 30 and lens 26 in the respective optical paths of the different channels 140a-140e are arranged in opposite order to the combination of the transform optics 126 and diffractive optical element 130 in the beam combiner 110 that receives the plurality of channels 140a' -140e' and combines them together into a single beam 132. (As discussed above, the spectral beam combiner 110 of FIG. 1 can be similar to that shown in FIG. 1 and have similar features as discussed above with reference to FIG. 1.) The system 100 therefore is symmetrical in the respect that on the opposite sides of the spectral channel splicer 150 and the reflectors 152a-152e are a positive lens 26, 126 and diffractive optical elements 30, 130 with the positive lenses closer to the reflectors 152a-152e and the diffractive optical elements farther from the reflectors. Moreover, on each of the opposite sides of the reflectors 152 are a negative lens 170a-170e, 160, a positive lens 26, 126 and diffractive optical element 30, 130 with the negative lenses closer to the reflector than the positive lenses and the positive lenses closer to the reflector than the diffractive optical elements.

Additionally, light from the light source 15 is shown in FIG. 3 as being collimated upon incidence on the diffractive optical element or grating 30. In the example shown in FIG. 3, light of the channel spectrum enters collimated into the grating 30 to be angularly dispersed into collimated beams incident on the positive lens 26. Conversely, the output beam 140a'-140e' is collimated by the transform optics 126 at the output of the system 100 and directed onto the diffraction grating 130 where the dispersed rays are assembled together into the collimated output beam 132. This arrangement of optical elements 126, 130 to assemble the different spectral channels into a single beam is the reverse of the splitting of the collimated beam emitted by the laser 15 by the diffractive optical element/grating 30 at the input of the system 100 and the convergence of this collimated beam by the positive lens 26 at the input. Similarly, the input beam transmitted through the negative lens 170 is directed to an angularly dispersed focus on the reflector 152 of the spectral channel splicers 150, converging, but at a small convergence angle than output by the positive lens 26. The angular dispersion beams 140a'-140e' after reflection from the respective reflectors 152a-152e of the spectral channel splicer 150 continue to the output negative lens 160 and the channel beams 140a'-140e' are divergent until the beams reach the spectral beam combiner 110 being more divergent after passing through the negative lens 170 on the output side. The light beams 140a'-140e' proceed to the positive beam shaping lens 126 after which the beams are collimated into the output grating 130. Likewise, the spectrums of the individual channels are combined together into one larger spectrum that is included in the output beam 132.

Additionally, as discussed above, different optical elements on the input side (e.g., M and N, the diffractive optical element 30, the positive lens 26 and negative lens 170a-170e) are the same in many respects having the same optical parameters such as focal lengths and/or are spaced by the same or similar distances. Also, the focal length of the negative lenses 170a-170e, 160 in the input and output spectral channel paths 140a-140e, 140a'-140e' may be the same.

Advantageously, the configurations shown and discussed herein may be used to combine light from a plurality of lasers wherein the beam output by the respective laser has wider spectral bandwidth. Additionally, less lasers may be needed to provide wider bandwidth with such designs. Such configurations that uses lasers having wider bandwidths can overcome several nonlinear parasitic effects that limit power outputs from narrow bandwidth lasers. The symmetric system may also reduce certain aberrations. For example, as discussed above, the optical paths through different channel optical elements (e.g., the diffractive optical element 30, the positive lens 26 and negative lens 170a-170e), as well as the spectrum angle of incidences are same as for the different spectral channels passing through the spectral beam combiner 110 comprising the transform lens 126 and the output diffractive optical element 130 and may possibly provide compensation for chromatic angular and focal aberration in the different channel paths.

In various implementations, the lasers 15 and other optics 30, 26, 170 included in the different laser channels 140 can be spread out by using the spectral channel splicer 150. Many spectral channels 140 can therefore be included thereby increasing the potential power of the combined system output 132. As illustrated in FIG. 3, these lasers 15 and other optical components 30, 26, 170 may be at different heights (e.g., in direction parallel to the y-axis such as vertical direction) such that the spectral channels are incident on the reflectors 152 of the spectral channel splicer 150 at different elevation angles, $\varphi$, so as to properly be incident on the spectral combiner 110 at the appropriate elevation angles, $\varphi$. As discussed above, FIG. 5 also shows these different spectral channels 140a-140e as being incident on and reflected from the reflectors 152a-152e at different elevation angles, $\varphi$, as a result.

FIG. 6, a top view of the reflectors 152, shows how the reflectors may be oriented azimuthally in different directions. FIG. 6, for example, shows that the azimuthal angles, $\theta$, of the incident spectral channel beams 140a-140e may be different by 5° as a result of the reflectors 152a-152e being rotated azimuthally 2.5° with respect to each other. The effect of this azimuthal rotation of the reflectors 152 on the spectral channels 140 is double, as both the angle of incidence and angle of reflection are affected by the rotation of the reflector. This arrangement may allow for mounting input sources 15 that are large logistically less complex than for designs that employ an array of narrow band emitters that are smaller. As discussed above, the reflectors 152 may comprise prisms such as TIR reflecting prisms, although other types of reflectors can be use as well.

FIG. 7 shows a top view of the spectral beam combining system 100. As illustrated, the different spectral channels 140a-140e are incident on the reflectors 152a-152e of the spectral channel splicer 150 at different azimuthal angles, $\theta$, and are redirected along the same or substantially the same azimuthal angle/direction such that the projection of the reflected beams 140a'-140e' on the xz plane or plane parallel thereto (e.g., horizontal plane) overlap or are superimposed and are aligned. In other designs, more spectral channels 140 could be included on the other side of the output beam 132, spectral channel splicer 150, spectral beam combiner 110, or any combination thereof. Also, as discussed above, the different channels 140a'-140e' may be redirected by the reflectors 152a-152e along a similar but non-identical azimuthal angles so as to provide for what is referred to as a "smile" or "frown" arrangement of light.

FIG. 8, a perspective view, shows the reflectors 152a-152e and reflected beams 140a'-140e' stacked on top of each other, e.g., linearly stacked, in a direction parallel to they axis (e.g., vertical direction). FIG. 8 also illustrates the plurality of laser beam 140a'-140e' reflected/deflected by the spectral channel splicer 150 into the same or substantially the same angle, $\theta$, (e.g., in a horizontal plane on which the channels are projected) and also being reflected/deflected (e.g., TIR reflected) in an orthogonal direction (e.g., in a vertical plane) by the reflectors (e.g., TIR reflectors) to provide the desired elevation angle, $\varphi$. In some implementations, the Littrow grating reflection order from the grating 130 of the spectral beam combiner 110 is used for beam overlap alignment inspection and may be directed in a channel gap that bypasses the reflectors. In various designs, the low power output grating Littrow refection will be a spectrally combined single small focal spot that passes between two channel TIR-reflectors 152 or to side thereof and may proceed to a beam dump and/or system diagnostic alignment system.

To arrange the reflectors 152a-152e in the proper orientation and arrangement, the reflectors may be included in a frame, housing or support structure 180 that holds the reflectors in the proper position and orientation, an example of which is illustrated in FIG. 9. In particular, the frame, housing, or support structure 180 maintains the reflectors 152a-152e in a stack, for example, parallel to the y axis (e.g., in the vertical direction). The frame, housing, or support structure 180 can have a wide variety of shapes, forms, configurations and be fabricated from a wide variety of different materials. As illustrated in FIG. 9, the reflectors 152a-152e are held or supported by the support structure such that the reflectors are oriented at different azimuthal angles, θ.

As discussed above, in various designs, the lenses and/or gratings may comprise $SiO_2$ (e.g., fused silica), which has low absorption. Also as discussed above, in various implementations, Nano anti-reflection coatings comprising a sub-wavelength (e.g., nanometer scale) texture or feature sizes comprising the same $SiO_2$ material may be less absorbing than other materials films such as optical coatings.

As discussed above, various systems are disclosed herein that include a spectral channel splicer and a spectral beam combiner. Spectral beam combining advantageously can increases laser beam focal spot intensity. Some spectral beam combiners may use narrow spectrum channels. The intensity from the individual channels may, however, be limited as nonlinear parasitic processes destroy the laser gain medium index of refraction homogeneity and optical components. Increasing the number of wavelengths in the individual laser channels can increase irradiance onset of these nonlinear events. For some designs, this appended channel spectrum bandwidth may be limited by angular dispersion and desire for combined beam focal spot peak irradiance.

Various designs described herein, however, support combining adjacent spectral channels of arbitrary spectral width. The spectrum of the individual channels can be increased suppressing the onset of the nonlinear impediments. Wider spectrum laser beams can sometime be 2-10 times the irradiance limits imposed by some narrow spectrum channels spectral beam combiner designs. Various systems discussed herein can provide suitable wavelength control and spectrums to fit the allocated channels of the spectral channel splicer. The laser channel size and weight may be reduced using the spectral channel splicer with a spectral beam combiner than if without using such a spectral channel splicer. Size and weight may potentially be reduced while the power may possibly be increased using the spectral channel splicer 150 in the spectral beam combining systems 100 discussed herein in comparison to systems without such spectral channel splicers.

The spectral channel splicer 150 described herein can be a compact assembly that enables the combining of adjacent spectral channels of arbitrary spectral widths into a low size, weight optical package.

The spectral channel splicer is an array of optical elements whose individual width along the output grating dispersion axis having spectral widths defining channels, potentially allowing replacement of narrow band spatial beam combiner emitters. An individual channel optical element or reflector can effectively replace many adjacent narrow band emitters. The individual channel optical element or reflector accommodates a wide spectrum and tilting the different channel's optical path allows separation of the different channel's input optical systems. The input channel optical elements can be identical in various implementations. Input channel optics may angularly disperse light from a laser having a broader band to replace many adjacent narrow band emitters, lessening the laser hardware needed (e.g., reducing the number of lasers).

Transmission type optical beam combiners 10, 110 employed herein may reduce optical path length of the system 100 as well as the beam size as the materials in transmissive optical components may absorb less and may be more tolerant to surface distortion than mirrors (although mirror may be employed in some designs). Reducing the size, e.g., cross-section of the beam orthogonal to its length (e.g., in the spectral beam combiner 110) may assist in reducing or ameliorating angular dispersive aberrations.

EXAMPLES

This disclosure provides various examples of devices, systems, and methods of combining optical beam. Some such examples include but are not limited to the following examples.

1. A spectral beam combining system comprising:
    a plurality of input channels comprising a plurality of respective laser sources configured to output respective input beams along respective optical paths, different input channels comprising different wavelengths;
    a spectral channel splicer comprising a plurality of reflectors, individual reflectors positioned to receive respective channels of the plurality of channels; and
    a spectral beam combiner comprising a diffractive optical element, said spectral beam combiner positioned to received light from said plurality of channels reflected off said plurality of respective reflectors, said spectral beam combiner configured to direct said plurality of input beams toward the same direction thereby forming an output beam comprising said plurality of input beams combined together.
2. The spectral beam combining system of Example 1, further comprising diffractive optical elements in the optical path of respective input channels, said diffractive optical elements configured to spectrally disperse wavelengths of light from said respective laser sources.
3. The spectral beam combining system of Example 2, further comprising positive lenses in the optical path of respective input channels, said positive lenses configured to converge light diffracted by said diffractive optical elements in the optical path of said respective input channels and to direct said light toward said respective reflectors of said spectral channel splicer.
4. The spectral beam combining system of any of the examples above, wherein said spectral beam combiner comprises transform optics that together with said diffractive optical element is configured to receive said plurality of input beams and direct said beams along the same direction.
5. The spectral beam combining system of Example 4, wherein said transform optics comprise a lens and said diffraction optical element in said spectral beam combiner comprises a diffraction grating.
6. The spectral beam combining system of any of the examples above, wherein said different reflectors are oriented in different azimuthal directions.
7. The spectral beam combining system of any of the examples above, wherein said reflectors comprise total internal reflecting prisms.
8. The spectral beam combining system of any of the examples above, wherein said reflectors comprise a stack of reflectors.
9. The spectral beam combining system of any of the examples above, wherein said spectral beam combiner diffractive optical element comprises a transmission diffractive optical element that diffracts light transmitted therethrough.
10. The spectral beam combining system of any of the examples above, wherein said spectral beam combiner further comprises a lens configured to direct the beams from said respective channels at appropriate angles such that the diffractive optical element in said spectral beam combiner diffracts said beams along the same direction.

11. The spectral beam combining system of any of the examples above, further comprising a plurality of negative lenses disposed in said optical paths of said respective channels between said light sources and said spectral beam splicer.

12. The spectral beam combining system of any of the examples above, further comprising a negative lens disposed in said optical path between said spectral beam splicer and said spectral beam combiner.

13. A spectral channel splicer comprising:
   a plurality of reflectors; and
   a frame or housing supporting said plurality of reflectors in a stack such that said reflectors are stacked in a first direction,
   wherein said reflectors are tilted with respect to a second direction different than said first direction such that different reflectors are oriented in different azimuthal directions.

14. The spectral channel splicer of Example 13, wherein said reflectors comprise total internal reflecting prisms.

15. The spectral channel splicer of Example 13 or 14, wherein said reflectors are oriented to reflect light incident thereon at a larger azimuthal angle, $\theta_1$, by a larger amount than light incident thereon at a smaller azimuthal angle, $\theta_2$.

16. The spectral channel splicer of any of Examples 13-14, wherein said reflectors are oriented to reflect light incident at an angle, $\varphi$, with respect to a plane wherein said plane is parallel to said first direction.

17. The spectral channel splicer of any of Examples 13-16, wherein said first direction is orthogonal to said second direction.

18. The spectral channel splicer of any of Examples 13-17, wherein said first and second directions correspond to vertical and horizontal directions, respectively.

19. The spectral channel splicer of any of Examples 13-18, wherein said reflectors are oriented in different azimuthal directions so as to receive respective laser beams of a plurality of laser beams from different azimuthal angles.

20. The spectral channel splicer of any of Examples 13-18, wherein said reflectors are oriented in different azimuthal directions so as to receive respective laser beams of a plurality of laser beams from different azimuthal angles and direct said laser beams along a common azimuthal angle.

21. The spectral channel splicer of any of Examples 13-19, wherein said reflectors are oriented in different azimuthal directions so as to receive respective laser beams of a plurality of laser beams from different azimuthal angles and direct said laser beams along a similar direction with some deviations in azimuthal angle between different beams.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A spectral beam combining system comprising:
   a plurality of input channels comprising a plurality of respective laser sources configured to output respective input beams along respective optical paths, different input channels comprising different wavelengths;
   a plurality of reflectors, individual reflectors positioned to receive respective channels of the plurality of channels; and
   a spectral beam combiner comprising a diffractive optical element, said spectral beam combiner positioned to receive light from said plurality of channels reflected off respective reflectors of said plurality of reflectors, said spectral beam combiner configured to direct said plurality of input beams toward the same direction thereby forming an output beam comprising said plurality of input beams combined together.

2. The spectral beam combining system of claim 1, further comprising diffractive optical elements in the optical path of respective input channels, said diffractive optical elements configured to spectrally disperse wavelengths of light from said respective laser sources.

3. The spectral beam combining system of claim 2, further comprising positive lenses in the optical path of respective input channels, said positive lenses configured to converge light diffracted by said diffractive optical elements in the optical path of said respective input channels and to direct said light toward said respective reflectors of said plurality of reflectors.

4. The spectral beam combining system of claim 1, wherein said spectral beam combiner comprises transform optics that together with said diffractive optical element is configured to receive said plurality of input beams and direct said beams along the same direction.

5. The spectral beam combining system of claim 4, wherein said transform optics comprise a lens and said diffraction optical element in said spectral beam combiner comprises a diffraction grating.

6. The spectral beam combining system of claim 1, wherein said plurality of reflectors are oriented in different azimuthal directions.

7. The spectral beam combining system of claim 1, wherein said plurality of reflectors comprise total internal reflecting prisms.

8. The spectral beam combining system of claim 1, wherein said plurality of reflectors comprise a stack of reflectors.

9. The spectral beam combining system of claim 1, wherein said diffractive optical element comprises a transmission diffractive optical element that diffracts light transmitted therethrough.

10. The spectral beam combining system of claim 1, wherein said spectral beam combiner further comprises a lens configured to direct the beams from said respective channels at appropriate angles such that the diffractive optical element in said spectral beam combiner diffracts said beams along the same direction.

11. The spectral beam combining system of claim 1, further comprising a plurality of negative lenses disposed in said optical paths of said respective channels between said laser sources and said plurality of reflectors.

12. The spectral beam combining system of claim 1, further comprising a negative lens disposed in said optical path between said plurality of reflectors and said spectral beam combiner.

13. A spectral channel splicer comprising:
a plurality of reflectors; and
a frame or housing supporting said plurality of reflectors in a stack such that said reflectors are stacked in a first direction,
wherein said reflectors are tilted with respect to a second direction different than said first direction such that different reflectors are oriented in different azimuthal directions.

14. The spectral channel splicer of claim 13, wherein said reflectors comprise total internal reflecting prisms.

15. The spectral channel splicer of claim 13, wherein said reflectors are oriented to reflect light incident thereon at a larger azimuthal angle, $\theta_1$, by a larger amount than light incident thereon at a smaller azimuthal angle, $\theta_2$.

16. The spectral channel splicer of claim 13, wherein said reflectors are oriented to reflect light incident at an angle, $\varphi$, with respect to a plane wherein said plane is parallel to said first direction.

17. The spectral channel splicer of claim 13, wherein said first direction is orthogonal to said second direction.

18. The spectral channel splicer of claim 13, wherein said first and second directions correspond to vertical and horizontal directions, respectively.

19. The spectral channel splicer of claim 13, wherein said reflectors are oriented in different azimuthal directions so as to receive respective laser beams of a plurality of laser beams from different azimuthal angles.

20. The spectral channel splicer of claim 13, wherein said reflectors are oriented in different azimuthal directions so as to receive respective laser beams of a plurality of laser beams from different azimuthal angles and direct said laser beams along a common azimuthal angle.

* * * * *